United States Patent
Sofra

(10) Patent No.: US 10,311,733 B2
(45) Date of Patent: Jun. 4, 2019

(54) METHOD FOR OPERATING A DETECTION DEVICE OF A MOTOR VEHICLE

(71) Applicant: Audi AG, Ingolstadt (DE)

(72) Inventor: Nikoletta Sofra, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 16/073,743

(22) PCT Filed: Jan. 16, 2017

(86) PCT No.: PCT/EP2017/050750
§ 371 (c)(1),
(2) Date: Jul. 27, 2018

(87) PCT Pub. No.: WO2017/129428
PCT Pub. Date: Aug. 3, 2017

(65) Prior Publication Data
US 2019/0012917 A1    Jan. 10, 2019

(30) Foreign Application Priority Data

Jan. 29, 2016    (DE) .................. 10 2016 000 970

(51) Int. Cl.
*G08G 1/01*    (2006.01)
*G08G 1/14*    (2006.01)
(Continued)

(52) U.S. Cl.
CPC ............ *G08G 1/143* (2013.01); *B60W 40/10* (2013.01); *G07B 15/02* (2013.01); *G08G 1/0112* (2013.01);
(Continued)

(58) Field of Classification Search
CPC .... G08G 1/143; G08G 1/0112; G08G 1/0141; G06Q 2240/00
(Continued)

(56) References Cited

U.S. PATENT DOCUMENTS 6,411,895 B1    6/2002    Lau et al.
9,652,986 B2    5/2017    Belzner et al.
(Continued)

FOREIGN PATENT DOCUMENTS

CN    104169990 A    11/2014
CN    104798122 A    7/2015
(Continued)

OTHER PUBLICATIONS

International Search Report and Written Opinion of the International Searching Authority directed to related International Patent Application No. PCT/EP2017/050750, dated Jun. 7, 2017, with attached English-language translation of Annex; 21 pages.
(Continued)

*Primary Examiner* — Eric Blount
(74) *Attorney, Agent, or Firm* — Sterne, Kessler, Goldstein & Fox P.L.L.C.

(57) ABSTRACT

The invention relates to a method for operating a detection device in a motor vehicle for a trip to a destination, wherein, by means of the detection device and on the basis of sensor data of the motor vehicle and/or on the basis of status data of at least one vehicle component of the motor vehicle, it is determined locally in the motor vehicle whether the motor vehicle is in a search phase, during which a driver of the motor vehicle is no longer driving toward the destination but rather is searching for a parking opportunity for the motor vehicle, and a duration of the search phase is determined by means of the detection device.

9 Claims, 1 Drawing Sheet

(51) Int. Cl.
*B60W 40/10* (2012.01)
*G08G 1/0967* (2006.01)
*G07B 15/02* (2011.01)

(52) U.S. Cl.
CPC ......... *G08G 1/0129* (2013.01); *G08G 1/0141* (2013.01); *G08G 1/096716* (2013.01); *G08G 1/096758* (2013.01); *G08G 1/096775* (2013.01); *G08G 1/148* (2013.01); *G06Q 2240/00* (2013.01)

(58) Field of Classification Search
USPC .................................. 340/932; 701/300, 301
See application file for complete search history.

(56) References Cited

U.S. PATENT DOCUMENTS

| | | | |
|---|---|---|---|
| 9,959,759 B2 | 5/2018 | Schulz | |
| 2010/0052946 A1* | 3/2010 | Levine | G08G 1/143 340/932.2 |
| 2010/0060485 A1 | 3/2010 | Kim | |
| 2014/0266800 A1 | 9/2014 | Koukoumidis et al. | |
| 2015/0213715 A1 | 7/2015 | Schulz | |
| 2016/0163197 A1* | 6/2016 | Levy | G08G 1/147 340/932.2 |
| 2016/0210860 A1 | 7/2016 | Belzner et al. | |
| 2017/0103649 A1* | 4/2017 | Belzner | G08G 1/0112 |

FOREIGN PATENT DOCUMENTS

| | | |
|---|---|---|
| DE | 102005027250 A1 | 12/2006 |
| DE | 102012201472 A1 | 8/2013 |
| DE | 102013212235 A1 | 12/2014 |
| DE | 102014212336 A1 | 12/2015 |
| EP | 1070635 A2 | 1/2001 |
| WO | WO-2015/197329 A1 | 12/2015 |

OTHER PUBLICATIONS

English-language abstract of German Patent Application Publication No. DE 102005027250 A1, published Dec. 14, 2006; 1 page.
International Preliminary Report on Patentability directed to related International Patent Application No. PCT/EP2017/050750, dated Jan. 4, 2018, with attached English-language translation; 15 pages.

* cited by examiner

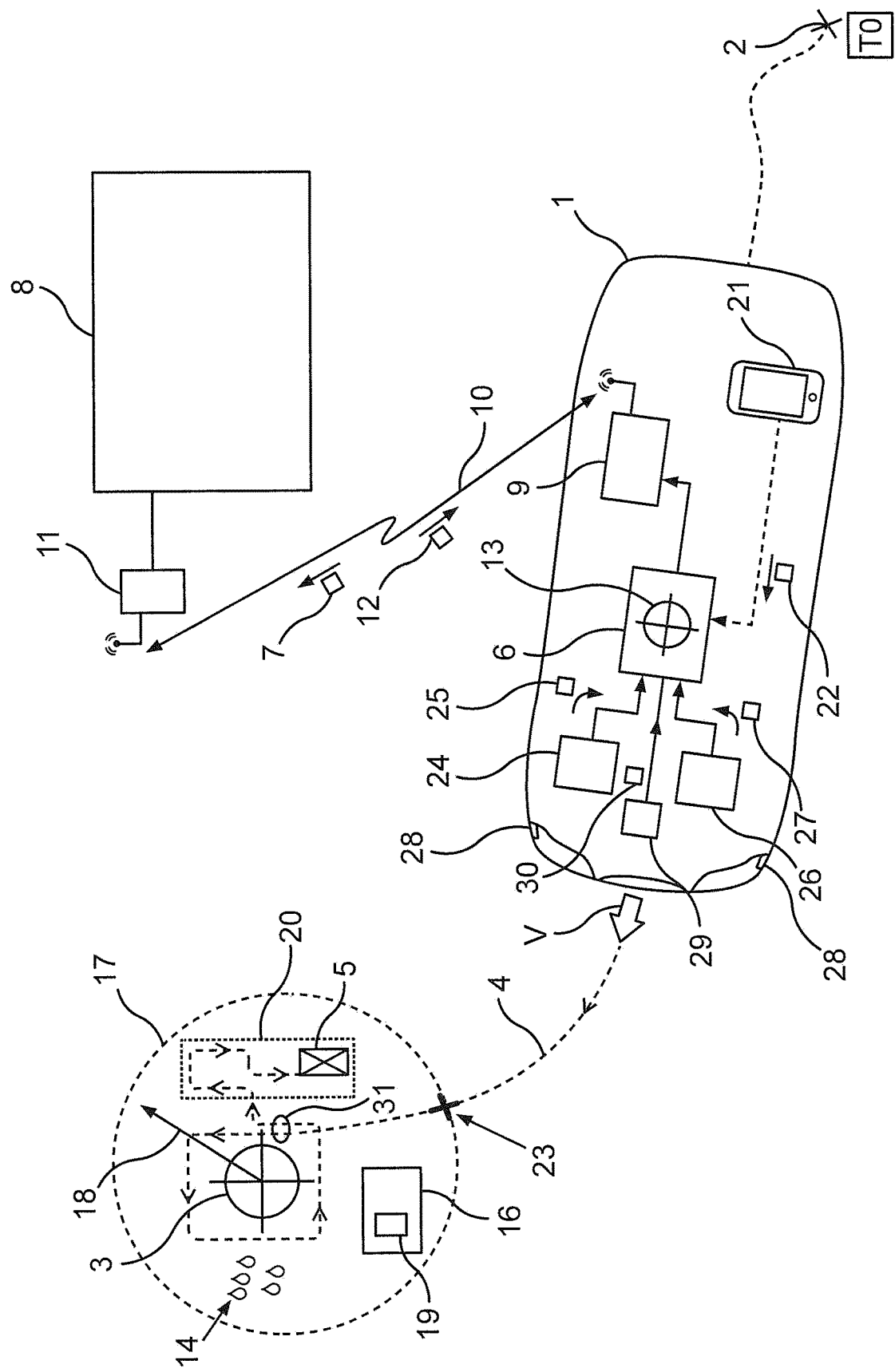

METHOD FOR OPERATING A DETECTION DEVICE OF A MOTOR VEHICLE

TECHNICAL FIELD

The disclosure refers to a detection device for a motor vehicle as well as to an operating method for the detection device. The detection device detects whether a driver is still on their way to the destination or has already reached the destination, while still looking for a parking opportunity for the motor vehicle.

BACKGROUND

In this context, US 2010/0052946 A1 discloses the fact that the search process may be recognized beforehand by means of a central server device, in that at regular intervals, position data and a corresponding time stamp are received from the motor vehicle. On the basis of this data, the server device retrieves in a digital map the driving route of the motor vehicle and recognizes, based thereon, whether the motor vehicle is moving with intent towards a destination or if the driver has performed a search for a parking opportunity. Based on the determined search phases of a plurality of motor vehicles, an average search time may be determined.

A drawback of this solution is that a broadband radio link is required in order to provide position data in the server device. If the radio connection breaks down, then information regarding the driving movements of the motor vehicle are missing, so that the server device is no longer able to analyze the pattern of driving movements. In order to observe a plurality of vehicles, the server device also needs a considerable computing power.

EP 1 070 635 A2 discloses a navigation method for providing a driver of a motor vehicle with navigation indications regarding a parking opportunity at a navigation destination. To this end, a parking availability management provides information regarding available parking places, from which a place near the navigation destination is selected and the motor vehicle is navigated towards the same. This method has the drawback that it may only work with already known parking places. This method cannot provide a driver with information regarding the expected time required for searching for a parking place within an unmanaged region.

DE 10 2005 027 250 A1 discloses a method for an automatic parking place search, which also allows a predictive recognition of parking places available in proximity of a destination which is indicated before starting the trip. The available parking places are automatically and autonomously determined directly after indicating the destination and may be retrieved, if desired, by the driver or displayed on a navigation display. This method too does only work if parking places are managed in a complicated way, in order to recognize free parking places and to display the same in a navigation device of the motor vehicle.

BRIEF DESCRIPTION OF THE DRAWINGS

FIG. 1 depicts a schematic representation of an embodiment of the inventive motor vehicle while driving toward a destination.

SUMMARY

The object of the disclosure is to provide a driver of a motor vehicle with an indication regarding the expected time required for performing a search of a parking opportunity of their motor vehicle within a destination region around a destination, in which the availability of parking places is unknown.

This object is achieved by the subject matter of the independent claims. Advantageous developments of the disclosure are obtained from the characteristics of the dependent claims, the following description and the FIGURE.

The disclosure provides a method for operating a motor vehicle, for assisting a trip to a destination. According to the method, a detection device determines, on the basis of sensor data of the motor vehicle and/or on the basis of status data of at least one vehicle component of the motor vehicle, such as an indicator, locally in the motor vehicle, whether the motor vehicle is in a search phase. According to an embodiment, the search phase is defined in that the driver is no longer driving toward the destination but rather is searching for a parking opportunity for the motor vehicle. The detection device determines or measures the duration of the search phase. The search phase ends when parking the motor vehicle, thus with a parking phase.

The disclosure provides the advantage that the detection device determines the duration of the search for a parking opportunity at the destination and/or for a destination region near the destination. This method may be performed, in many instances, by means of the same motor vehicle and/or by means of a plurality of motor vehicles, so that a statistical evaluation of the duration of search phases may be obtained for the destination or for a plurality of destinations. An expected or average search duration, i.e. an average duration of the search phase may thus be determined for a destination or for a destination region around the destination. It is therefore possible to collect, for example, each determined search duration from each motor vehicle centrally in a vehicle-external server device, and then, if required, a motor vehicle may be provided with an average known search duration to a destination, to which the present motor vehicle has to be navigated to or which lies near the same.

The method for determining the search duration is independent, per se, from a radio connection to a central server device. On the contrary, the determination of the search duration takes place within the motor vehicle by means of the detection device. An additional advantage is thus obtained in that sensor data and status data may be used, the transmission of which would otherwise overload the bandwidth or transmission rate of a conventional radio connection between a motor vehicle and a central server device. Additionally, the processing of data onboard the vehicle (detection of parking search) allows the integration of data protection methods, such as for example the input of the required time for each city district or geographical region or street or street portion or a time window, without transmitting the entire position chain. Said parameters may be set in real time by a vehicle-external server, so that the location resolution available to the server may be varied or set.

The disclosure also comprises optional developments, the characteristics of which provide additional advantages.

According to a development, in order to determine the search duration, the destination is known or stored in the detection device. The destination may, for example, be input or defined by the driver before or during the trip, such as a navigation destination for a navigation assistance. The detection device recognizes the start of the search phase depending on a distance of the motor vehicle from the destination. The sensor data used for recognizing the current position of the motor vehicle may for example be position data of a receiver for a signal of a GNSS system (global navigation satellite system), such as the GPS system (global positioning system). By defining the distance or radius, a region or destination region near the destination is defined, within which the driver is expected to search for a parking place. The distance or radius may be determined or defined, in particular, depending on the total length of the driving route. The total length is obtained as the distance or driving distance between a trip starting point and the destination.

According to a development, in order to determine the duration of the search by means of the detection device, the search phase is recognized on the basis of at least one predetermined pattern of driving behavior of the driver. To this end, for example, said sensor data such as the position and/or driving trajectory of the motor vehicle and/or the driving speed of the motor vehicle and/or said status data, such as the operation of an indicator and/or a steering angle of a steering wheel may be determined as a respective time profile or respective time sequence and compared to at least one predetermined pattern of driving behavior. This may provide the information whether the driver is still navigating the vehicle toward a distant steady destination, i.e. a destination point, or whether the driving direction is deviating from the destination, because the driver is looking for a parking opportunity. Said evaluation of sensor data and/or status data may also occur at a following time, when the motor vehicle has been parked and/or positioned or switched off. To this end, for example, a ring buffer or ring memory may be provided, in which the time sequences of sensor data and/or status data are stored, in order to determine after the start of a parking phase has been recognized, a posteriori, the start of a search phase and then determine the search duration. Moreover, based on sensor data and/or status data, a repeated passage, i.e. driving repeatedly past a determined position and/or the road choice and/or the relative driving speed with respect to the surrounding traffic may be recognized. Road choice means in this context that it is recognized whether the driver is choosing a road category, such as a freeway or an access road, which may be reasonable in the context of reaching a destination. If the driver is driving through a smaller street category, than required, such as a residential road or even a one-way road, it may be expected that navigation is no longer towards a destination but rather that the start of the search for a parking opportunity has begun. According to a development a component within the motor vehicle predicts or detects by means of machine-learning the start of the parking phase, based on a model. The model used is trained on the basis of previous parking processes.

According to a development, when determining the search duration by means of the detection device, environmental sensor data are determined on the basis of at least one environmental sensor device of the motor vehicle. These environmental sensor data describe at least one environmental condition or surrounding condition, which is present during the search at destination. The environmental sensor data are communicated together with the determined search duration to a vehicle-external server device. The determined environmental data may for example be weather data, such as data indicating the presence of rain and/or wind strength at destination. Through environmental sensor data the time of day of search may also be indicated. Thus it is advantageously taken into account, that the parking behavior of other vehicle users may vary depending on environmental conditions. In case of rain, more people will use a motor vehicle instead of public transportation means, for example, so that at destination more parking places may be occupied.

The disclosure also comprises embodiments, which refer to the assistance to the driver, after a value of an average search data for a destination is already known. In one of these embodiments, time data corresponding to a destination region, in which the destination lies, and which indicate a statistically expected, anticipated duration of the search for the parking opportunity in the destination region, are received and provided in the motor vehicle from a vehicle-external server device, such as an internet server. The driver may thus anticipate how long the search for a parking opportunity will probably last (as a statistical average). This may already be communicated to the driver when selecting the destination or when inputting the same, so that the driver may already know, before starting the trip to destination, how much time has to be planned in order to search for a parking opportunity. The prognosis of the estimated expected search duration may take into account the described environmental conditions at the destination, such as weather, time and/or weekday. The embodiment which comprises the transmission of time data represents an embodiment which is independent from the previously described methods for determining the search duration.

A development comprises the limitation of the search duration to a maximum threshold value. In this development, the position of a paid parking place is determined within the destination region and a time value required for parking the motor vehicle at the paid parking location and for transferring from the parking location to destination is determined. Transferring in this context means that it must be taken into account that the driver after parking the motor vehicle at the paid parking location has also to walk and/or drive by means of public transportation means from the parking location to the actual destination. The transfer is thus the continued trip without the motor vehicle. The required time is output in the vehicle. A paid parking place may for example be provided within a parking house and/or a parking lot. This embodiment thus provides the driver with the optional indication or provision of an exit route from the parking house or parking lot, wherein the duration of the walking trip or in general for transferring is then known to the driver. If the driver thus considers the probable search duration to be too long or if after the search duration, no parking opportunity can be found, they may exit the paid parking place, and thus ensure that only the time determined will be required.

It is particularly preferred, in this case, that the cost for parking the motor vehicle on the paid parking place is determined and provided to the driver. The driver is thus provided with the option to pay the parking fee or to use the determined average search duration for searching the parking place. The cost may for example be determined by indicating a parking destination to a server for managing paid parking places and subsequent reception of a cost information from this server.

If the driver is provided with the expected average search duration for searching a parking opportunity, the driver is obviously not sure whether actually the expected search time will be required, since it is a statistical average value. In order to advantageously increase the probability that a successful search is performed within the search duration, in an embodiment, within said destination region around the destination, a partial region is determined, such that the shortest expected search duration is obtained. Thus, for example, a single time duration value for the search duration is not uniformly determined within a predetermined radius around the destination, but rather for different partial regions within the destination region, a respective time duration value for the search duration is provided. In the motor vehicle, then, a navigation indication is output, which leads to the partial region having the shortest expected search duration. The driver thus obtains a recommendation about which partial region, i.e. which road or which stretch of roads has the highest probability to find a free parking opportunity. The motor vehicle may thus be driven precisely to the statistically most advantageous partial region. In an embodiment, for determining the partial region with the shortest expected search duration, said environmental conditions, such as the weather, the time of the day and/or the weekday are taken into account.

In a development it is ensured that the determined expected search duration, which has been received by the vehicle-external server device, may also be already considered when planning the trip. In this embodiment, the detection device receives appointment data or calendar data, such as those which may be retrieved or requested on the internet from a smartphone or another portable mobile terminal device or an online calendar. Based on the calendar data, a required time to arrival at destination is determined. The calendar data may for example thus indicate when the arrival at a predetermined destination is planned. Based on the time of arrival a trip start time is then determined by the detection device. To this end, based on the planned time of arrival, an expected trip duration from a predetermined trip starting point to the destination region, in which the destination lies, is determined, and based on the time data for the predicted search duration for a parking opportunity within the destination region, a time of departure for starting the trip is determined. When the driver is thus informed about the time of departure, it may be ensured not only that the destination is reached within the driving duration thus provided, but also that time for searching the parking opportunity is available, while still being able to reach the appointment in time according to calendar data.

The inventive method allows, in the described manner, the recognition of the search phase within the motor vehicle and may thus be performed by a vehicle-internal component.

Embodiments of the present disclosure correspondingly also comprises a detection device for a motor vehicle, which may be installed or provided on a motor vehicle. The inventive detection device is adapted for performing an embodiment of the inventive method. The detection device may for example be a program module of an infotainment system (information-entertainment system) or a navigation system of a motor vehicle. The detection device may also be provided as a portable mobile terminal device. To this end, a corresponding program module for performing the inventive steps by a processor device of the terminal device is provided, wherein the program module may for example be provided as a so-called application (app).

DETAILED DESCRIPTION

An exemplary embodiment of the disclosure is described in the following. To this end, the single FIGURE (FIG. 1) shows a schematic representation of an embodiment of the inventive motor vehicle while driving toward a destination.

The embodiment described in the following is a preferred embodiment of the invention. In the example, the described components of the embodiment represent respective individual characteristics of the invention, which are independent from each other, and which develop the invention independently from each other and thus have to be considered individually or in any other combination differing from the combination shown. Moreover, the described embodiment may also be completed with further already described characteristics of the invention.

The FIGURE shows a motor vehicle 1, which is an automobile, for example, such as a car. The motor vehicle 1 of the example is on a trip from a trip starting point 2 to a navigation destination 3. The navigation destination in this case represents a trip destination. In the FIGURE, an already traveled driving route as well as a future driving route or trail 4 of motor vehicle 1 are shown. At destination 3, a driver of the motor vehicle 1 needs a parking opportunity 5, in order to park the motor vehicle 1. Only thereafter may the driver walk to the actual navigation destination 3, such as a building or an event.

In the motor vehicle 1, both a search duration required by the driver for finding a parking opportunity 5 may be determined and an information regarding the expected or statistical average search duration may be provided to the driver.

The motor vehicle 1 is provided, to this end, with a navigation device 6, which for example may be a navigation apparatus mounted on the motor vehicle 1, such as a module of an infotainment system of the motor vehicle 1. The navigation device 6 represents a detection device. The navigation device 6 determines whether the motor vehicle 1 is in a driving phase, during which the motor vehicle 1 is guided by the driver to the navigation destination 3, or in a search phase, in which the driver has already reached the navigation destination 3 but is still performing the search for the parking opportunity 5 with the motor vehicle 1.

The navigation device 6 may then measure or determine a search duration 7 of the search phase and transmit the same to a central server device 8. The central server device 8 may for example be an Internet server. In order to transmit the search duration 7, the motor vehicle 1 maybe provided with a communication device 9, such as a mobile radio module or a WLAN module (WLAN—wireless local area network). Through the communication device 9, a radio connection 10 may be established to a vehicle-external communication device 11, such as a Wi-Fi router or a mobile radio network, through which the search duration 7 may be provided to the server device 8. The navigation device 6 may, on the other hand, also receive time data 12 from the server device 8, which indicate the expected search duration, as determined by the server device 8, for example on the basis of time data of previous searches by other motor vehicles.

In order to perform the trip to navigation destination 3, the driver may have determined, for example, the navigation destination 3, as a navigation setting 13 in the navigation device 6. Then the navigation destination 3 is known within the navigation device 6. The navigation device 6 may now adapt an expected time of arrival TOA—time of arrival) on the basis of the time data 12 and not only inform the driver about the time the navigation destination 3 will likely be reached by the motor vehicle 1, but also the time the search for the parking opportunity 5 will be concluded. The navigation device 6 thus plans the buffer for parking depending on the destination. In addition the weather 14 in the area of the navigation destination 3 and/or the time of day, at which the search of the parking opportunity 5 will take place, may be considered. Correspondingly the time data 12 may be provided separately, categorized by the server device 8 according to weather and/or time of arrival, and obviously also according to destination.

The driver thus obtains a more realistic estimate regarding the time at which navigation destination 3 will actually and materially be reached and they may operate without the motor vehicle. Therefore, if the driver has an appointment set at navigation destination 3, a time buffer for searching the parking opportunity 5 has no longer to be planned, since an estimated time for search is already provided. In navigation device 6, he estimated time may be indicated separately, for example in a time ledger or as a separate indication, such as time to destination on one hand and parking time on the other.

Moreover an information regarding a parking garage 15 or a plurality of parking garages or parking lots in a destination region 17 around the navigation destination 3 may also be comprised. The destination region 17 may for example be defined by setting a distance or radius 18 around the navigation destination 3. The radius 18 may in particular depend on a total length of the driving distance from a trip starting point 2 to navigation destination 3. In a parking garage 16, a paid parking place 19 may be available, so that the driver of motor vehicle 1 may be provided by the navigation device 6 with the option to park in the paid parking place 19, whereby no additional search duration is caused, but only a fixed time duration for transferring from the parking garage 16 to navigation destination 3. For comparison, the driver may be provided by the navigation device 6 with the probable search duration on the basis of the time data 12 for searching the parking opportunity 5 on its own. The driver may then decide which of the two options is more advantageous. The costs for the paid parking place 19 may also be determined to this end by the navigation device 6 in the already described manner.

In addition, the navigation device may also recommend the driver which partial region 20 within the destination region 17 is expected to have the shortest search duration. To this end, the driver may also be provided with navigation indications, in order to establish in which street a parking opportunity 5 is to be found.

Moreover, calendar data 22 obtained from a personal portable mobile terminal device 22, such as a smartphone or a tablet PC, or from an internet page or even from the same navigation device may be used, in order to determine a time of departure T0, at which the trip has to start at the trip starting point 2, in order for the driver to have enough time for performing the trip including the search for the parking opportunity 5, so that an appointment defined by the calendar data 22, may be reached in time at navigation destination 3.

In order determine the search duration for searching the parking opportunity 5, the navigation device 6 recognizes the time at which the driving phase ends and the search phase starts. The end of the search phase is obviously defined by the parking or switching off of the motor vehicle 1 at the parking opportunity 5. The start of the search phase may for example be defined as the time 23 of entering the destination region 17 or the first instant in time, in which the passing by or reaching of the navigation destination 3 occurs. This may be determined by means of the navigation setting 13. Thus, when the navigation system is activated, the duration between the reaching of the destination region 17 or navigation destination 3 and the exit of the driver from the motor vehicle may be defined as the search duration 7 and transmitted to the server device 8. The server device 8 then may use the search duration 7 while updating the time data 12.

If the navigation system is inactive, i.e. when the navigation setting 13 has not been input by the driver, the navigation device 6 may also use at least one sensor device 24 for determining sensor data 25 and/or at least a vehicle component 26 for determining status data 27. The sensor device 24 may comprise, for example, a receiver of a signal of a GNSS, so that the current position of motor vehicle 1 may be used as sensor data 25. A vehicle component may for example be a control device for a driving direction indicator or blinker 28 of motor vehicle 1, so that the driving direction indications may be processed as status data 27. A further sensor device 24 to be used may be a driving speed measurement device, for example, so that sensor data 25 may include the driving speed V of motor vehicle 1. A further sensor device 24 may also be a surroundings monitoring system of the motor vehicle 1, so that sensor data 25 may comprise, for example, the relative speed of motor vehicle 1 relative to the surrounding vehicular traffic. If the vehicle is moved slowly by the driver with respect to the traffic flow, then it is presumed that the driver is looking around for a parking opportunity 5. In the destination region 17, for example, environmental sensor data may also be detected by the environmental sensor device 29 of motor vehicle 1, in order to determine weather 14 in the destination region 17, for example, and the environmental sensor data 30 may be transmitted to the server device 8 together with the determined search duration 7.

If the navigation system is inactive, i.e. if the navigation destination 3 is unknown, the setting of an indicator and/or the driving at low speed with respect to traffic flow around the exit point at the parking opportunity 5, the driving on roads of lower class around the exit point at parking opportunity 5 and a repeated passing 31 around the exit point at parking opportunity 5 may be recognized by the navigation device 6 on the basis of the sensor device 24 and/or the vehicle component 25, in order to estimate the start of the search phase. The time duration 7 is then subsequently estimated after finishing the parking maneuver.

The time duration 7 is then collected in the server device 8 together with further time duration data of other motor vehicles, and analyzed, in order to differentiate the same in connection with the time of day, the weekday and/or the weather conditions. Thus, statistical estimates are generated, which depend on these different factors. These estimates are determined as time data 12 depending on destination and updated, as required. Thus the navigation device 6 adapts the "time of arrival" indicated during navigation on the basis of the time data 12.

In conclusion, the example shows how the invention may include a parking place search duration into the navigation.

The invention claimed is:

1. A method for operating a motor vehicle for a trip to a destination, the method comprising:

locally determining, by a detection device based on sensor data of the motor vehicle and status data of at least one vehicle component, whether the motor vehicle is in a search phase during which a driver of the motor vehicle is no longer driving toward the destination but is searching for a parking opportunity for the motor vehicle;

determining, by the detection device, a search duration of the search phase;

determining, by at least one environmental sensor device of the motor vehicle during the determination of the search duration, environmental sensor data which describes at least one environmental condition and which are present during the search phase at the destination, the environmental sensor data including weather data and a time of day;

communicating the environmental sensor data together with the determined search duration to a vehicle-external server device; and in the vehicle-external server device:

collecting and analyzing the search duration and search duration data of other motor vehicles;

generating statistical estimates that indicate a statistically expected estimated search duration for the parking opportunity within a destination region within which the destination lies by differentiating the collected search durations based on corresponding times of day, a day of the week, and the weather condition, wherein the statistical estimates are dependent on the time of day and the day of the week and the weather condition, and wherein the statistical estimates are determined as time data depending on a respective destination.

2. The method of claim 1, wherein, for determining the search duration, the destination is stored in the detection device and the detection device recognizes a beginning of the search phase depending on a distance between the motor vehicle and the destination.

3. The method of claim 1, wherein, for determining the search duration, the search phase is recognized based on at least one predetermined pattern of a driving behavior of the driver.

4. The method of claim 1, wherein the time data is received from the vehicle-external server device and is provided to the motor vehicle.

5. The method of claim 4, wherein a position of a paid parking location in the destination region is determined and a time value of time required for parking the motor vehicle at the paid parking location and for transferring from the parking location to the destination is determined and the determined time value of the time required is output to the motor vehicle.

6. The method of claim 5, wherein a cost for parking the motor vehicle at the paid parking location is determined and output to the driver.

7. The method of claim 4, wherein within the destination region, a partial region is determined, such that a shortest expected search duration is obtained, the method further comprising providing a navigation indication in the motor vehicle that leads to the partial region.

8. The method of claim 4, further comprising:

receiving, by the detection device, calendar data;

determining a required time of arrival at the destination; and determining a time of departure for starting the trip based on the time of arrival, an expected driving time from a predetermined trip starting point to the destination region, and the time data.

9. A detection device, comprising:

one or more circuits and/or processors configured to:

determine, based on sensor data of a motor vehicle and status data of at least one vehicle component, whether the motor vehicle is in a search phase during which a driver of the motor vehicle is no longer driving toward a destination but is searching for a parking opportunity for the motor vehicle;

determine a search duration of the search phase; and communicate environmental sensor data received from at least one environment sensor data together with the determined search duration to a vehicle-external server device.

* * * * *